Patented Apr. 10, 1945

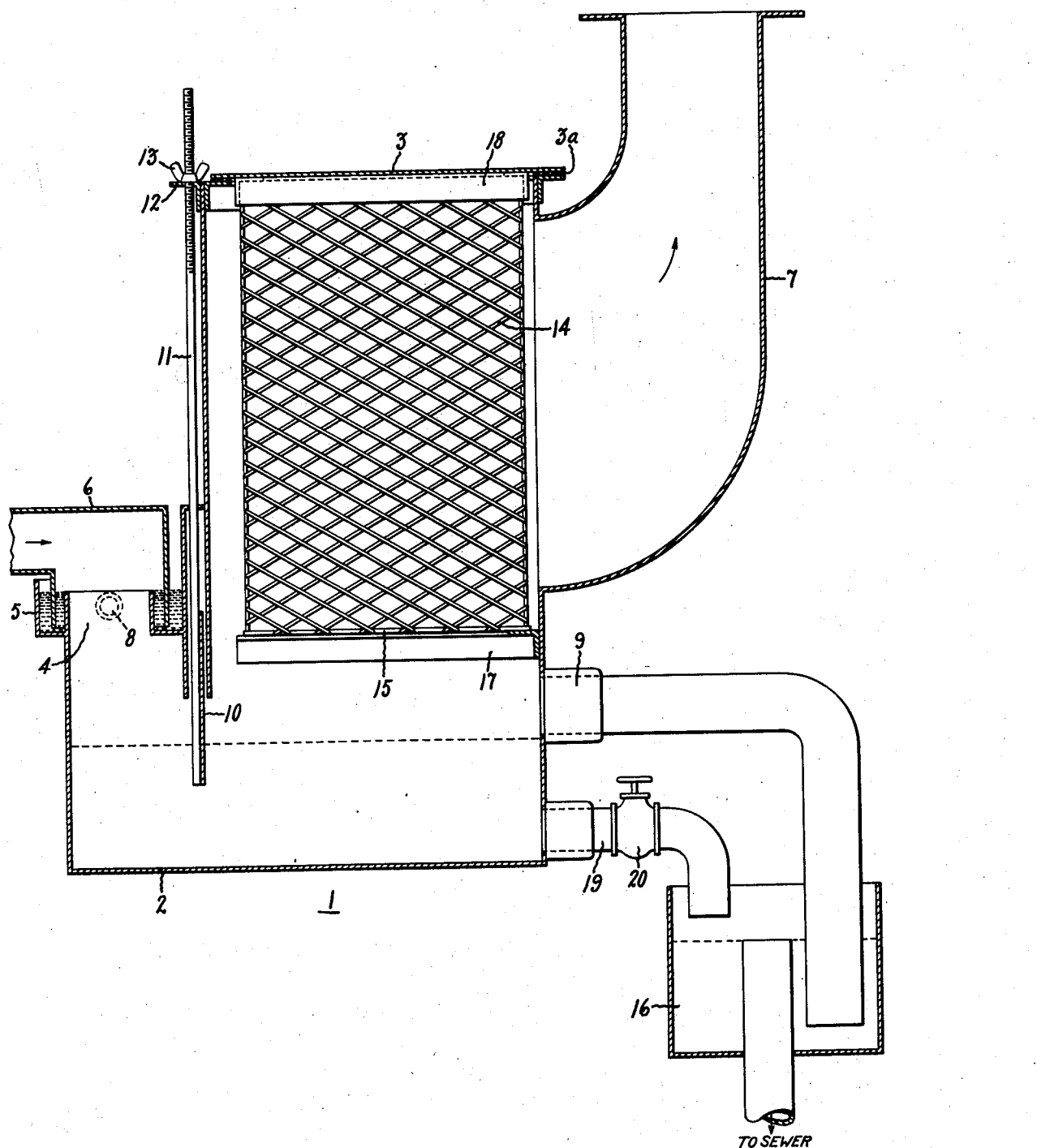

2,373,565

UNITED STATES PATENT OFFICE 2,373,565

GAS SCRUBBER

Oscar W. Hupp, Schenectady, N. Y., assignor to General Electric Company, a corporation of New York Application February 25, 1943, Serial No. 477,077

5 Claims. (Cl. 183—8)

The present invention relates to gas scrubbers for removing the water soluble and emulsifiable constituents from the air streams exhausted from enamelling ovens. It is particularly concerned with apparatus for removing the corrosive ingredients from the exhaust gases issuing from ovens used to bake varnishes of the vinyl acetal type or other varnishes containing cresylic acid as part or all of the varnish solvent.

The usual varnishes of the vinyl acetal type contain cresylic acid as an essential component of the varnish solvent. A second solvent such as petroleum naphtha may also be present. The fumes carried by the air stream drawn through ovens wherein such varnishes are being heat-hardened are particularly troublesome. They not only constitute a fire hazard, but also readily condense on and corrode or otherwise damage the exhaust equipment and any other metal equipment in the vicinity of the ovens. The usual gas washers wherein the oven exhaust gases are passed through a water spray have been found to be of little or no value for removing these deleterious constituents. In fact, I have found that to remove the condensate from the oven exhaust gases, the gases must be brought into contact with a body of water with sufficient force to obtain a turbulent mixing of the gases with the water with the resultant formation of an emulsion of water and the constituents of the gas and to separate the emulsion from the wash water before it breaks into its separate components.

An object of the present invention is to provide an improved gas scrubber for the purposes specified above. A further object of the invention is to provide a simple gas scrubber wherein the air or gas stream is so drawn through a body of water as to create a positive and violent agitation or churning of the water to produce a floating emulsion of the water and the condensate present in the gas stream. Another object of the invention is to provide in a gas scrubber a simple arrangement for controlling the amount of agitation of gases with the water to accommodate any style of exhausting fan or other exhaust equipment. Further objects of my invention will become apparent from the following description of my invention taken in connection with the accompanying drawing in which the single figure illustrates a view, partly in cross-section, of one form of gas scrubber embodying my invention.

With reference to the drawing, the gas scrubber broadly indicated by numeral 1 is adapted to be connected into the exhaust line between a varnish baking oven and an exhaust fan or other means employed to draw the fume-laden air stream from the baking oven. The scrubber comprises a chamber 2 which is preferably rectangular and which is adapted to contain a quantity of wash water. This chamber is provided with a removable air-tight cover 3 sealed by means of a sponge rubber gasket 3a, a gas inlet 4 connected by means of a water seal 5 with a conduit 6 for the gaseous mixture drawn from the baking oven, and a gas outlet 7 in the upper part of the wall of the chamber opposite the gas inlet. The gas outlet, which is connected directly or indirectly with an exhaust fan, preferably has a cross-sectional area considerably larger than the cross-sectional area of the gas inlet.

During operation of the scrubber fresh water is continuously supplied through pipe 8 to the water seal 5. The overflow from the water seal flows through inlet 4 into the scrubber chamber so that this inlet functions as a combined water and gas inlet. The used wash water and condensate removed from the air stream flows out of the chamber through water outlet pipe 9 located in the chamber wall opposite the combination gas and water inlet at a height sufficient to maintain a substantial body of water in the chamber at all times.

In order to obtain an intimate mixing or churning of the incoming water and gas, the scrubber is provided with a vertically adjustable weir or partition 10 extending entirely across the chamber in the path of the incoming gas and extending below the surface of the water in the chamber to form with the bottom and sides of the chamber a restricted passage below the normal surface of the water through which the oven exhaust gas is drawn. The partition is supported by any suitable means such as rods 11, only one of which is shown in the drawing. The upper threaded ends of the rods pass through suitable holes in a flange 12 secured to the upper part of the chamber and are provided with wing nuts 13 bearing against flange 12. By turning wing nuts 13 on the threaded ends of the rods, the partition may be elevated or lowered to vary the size of the passageway below the partition.

It will be seen that in this construction one function of the partition is partially to divide chamber 2 into a small inlet part and a large outlet part. By this arrangement the incoming fume-laden air stream, which is traveling at a relatively high velocity through the inlet part of relatively small cross-sectional area, enters the water column at a speed sufficient to obtain a thorough mixing of the gas with the liquid. The optimum size of the opening or passage below the partition depends on the style and capacity of the exhausting equipment employed. For any given exhauster capacity, a decrease in the size of this opening results in an increased churning of the gas with the water, but as this action is accompanied by a decrease in the total quantity of air and vapor drawn from the oven per unit time, maximum efficiency of the scrubber is obtained by taking both factors into consideration and adjusting the size of the passage so as to obtain maximum resistance to gas flow through the water and maximum gas velocity through the intake end of the scrubber. Obviously the partition should not extend so far below the surface of the water that the column of water to the left of the partition is of a height greater than the exhausting capacity of the exhaust fan.

The violent agitation obtained as the gas is drawn through the water beneath partition 10 results in a thorough washing of the gas and the formation of a temporary emulsion which floats to the surface of the wash water and is carried away along with the used wash water through water outlet 9 located in the wall of the chamber below the gas outlet. This emulsion, which comprises cresylic acid, solvents, water, and any water-soluble constituents of the gas with a sufficient number of trapped air bubbles to cause the emulsion to float to the surface of the water, is carried by the outgoing water into an overflow sump 16, the outlet of which is connected to a sewer. As it is necessary to maintain within the chamber the partial vacuum created by the exhausting equipment, the sump is located at a level below the bottom of the scrubber proper with the end of the water outlet 9 dipping below the surface of the water in the sump. The difference between the levels of the scrubber and sump should be sufficient to form a water seal capable of maintaining a reduction of pressure of from 6 to 10 inches of water in the chamber.

Mounted in the upper portion of the outlet end of chamber 2 and in front of the gas outlet is a basket or container 14 having wire mesh sides and a solid bottom 15. The wire basket 14 is filled with a mass of metal turnings (not shown) which act as a filter in removing any water and condensate carried by the exhaust gases passing therethrough and is partly supported in front of gas outlet 7 by means of an angle iron 17 mounted horizontally on the outlet and two adjacent walls of the chamber at a level above the water outlet and below the gas outlet. The basket is of such dimensions as to fit snugly in the upper portion of chamber 2 and to cover entirely the gas outlet 7 so that all of the exhaust gases and air leaving the chamber must pass through the filtering medium. As a means of preventing the gas from passing above the basket, the basket is provided with a rectangular closure member 18 which in turn is secured to the removable cover 3. By this arrangement, the basket along with the cover may be removed if necessary to clean the filtering material. Immersion in a hot caustic solution for a short period of time is sufficient to remove the viscous condensate which gradually collects on the filtering material and on the baffle portion of the basket.

The solid bottom of the basket and the angle iron support cooperate to form a baffle extending from the outlet wall of the chamber, which deflects the main air stream released from the body of water below the basket back and around the bottom of basket 14 and finally through the filtering material. Part of the separation of the entrained water from the gas is accomplished by the general construction of the scrubber. Since the outlet end of the scrubber is considerably larger in cross-sectional area than the inlet end, the speed of the gas stream passing through the scrubber is markedly decreased after is passes beneath the adjustable partition and up through the column of water on the outlet side of the partition. The changes in both the velocity and the direction of the air stream beneath the baffle prevents the gas stream from carrying any substantial amount of water to the filter.

For periodically flushing the chamber proper, there is provided a cleanout drain 19 provided with a valve 20 which is normally closed. This drain may conveniently empty in the overflow sump 16.

From the above description it will be seen that I have provided a simple gas scrubbing apparatus so constructed that no mechanical agitators or other moving parts are employed to obtain the necessary violent agitation or mixing of the fume-laden air stream and water passing through the scrubber and the separation and removal of the emulsion formed during the scrubbing action. Without the continuous churning which produces the emulsion, the viscous condensate would sink to the bottom of the chamber as a sticky viscous mass which would quickly plug the apparatus, pipes, and exhaust equipment.

While there has been shown and described a particular embodiment of this invention, it will be obvious to those skilled in the art that various changes and modifications can be made therein without departing from the invention and therefore it is intended in the appended claims to cover all such changes and modifications as fall within the true spirit and scope of the invention.

What I claim as new and desire to secure by Letters Patent of the United States is:

1. A gas scrubber for removing emulsifiable constituents from a gas stream comprising a chamber adapted to contain a body of wash water, a gas inlet at one end of said chamber connected by means of a water seal with the source of the gases to be scrubbed, means for supplying water to said water seal, the said water seal being so constructed that the overflow therefrom flows down the walls of the gas inlet into said chamber, a gas outlet in the wall of said chamber opposite the gas inlet, the said gas outlet having a cross-sectional area substantially greater than that of the gas inlet, a vertically adjustable partition between the gas inlet and outlet dipping below the normal surface of the wash water and forming with the bottom wall of said chamber a restricted passage for the gases passing through said chamber, a water outlet opposite the restricted passage and below said gas outlet for removing wash water and the emulsified constituents of the gas stream from said chamber, and a baffle extending from the outlet wall of said chamber above the water outlet and below the gas outlet for changing the direction of flow of the gas stream liberated from the body of wash water.

2. An apparatus for removing emulsifiable and water soluble constituents from gases comprising a chamber adapted to contain wash water, a gas inlet at one end of said chamber, the said inlet being connected by means of a water seal with a conduit for said exhaust gases, said water seal being a source of fresh wash water for said chamber, a gas outlet having a cross-sectional area substantially larger than that of said gas inlet, an adjustable partition between the gas inlet and gas outlet dipping below the normal surface of the water in said chamber and cooperating with the bottom of said chamber to form a restricted passage for the incoming gases below the surface of the wash water, a water outlet below said gas outlet for removing emulsified and water-soluble constituents of the gas from said chamber, a baffle extending from the outlet wall of said chamber and adjacent said water outlet and below said gas outlet for rapidly changing the direction of flow of gases leaving said wash water in the neighborhood of the water outlet and filtering means located above said baffle and in the path of the gases leaving said chamber through the gas outlet.

3. A gas scrubber comprising a rectangular chamber adapted to contain wash water, a combination gas and water inlet, said inlet comprising a water seal for connecting said apparatus to a conduit for the gas, a gas outlet of greater cross-sectional area than said gas and water inlet, a water outlet so positioned as to maintain the water in said chamber at a predetermined level, an adjustable weir between the water inlet and outlet adapted to dip below the normal surface of the water in said chamber and to direct the flow of the incoming gas below the normal level of the water in said chamber, and means for removing the final traces of liquid suspended in the gas leaving said chamber, said means comprising a filter structure having reticulated sides and a solid bottom, means supporting said filter structure in front of said gas outlet and above the water outlet so that the bottom thereof forms a baffle extending from the outlet wall of said chamber above the water outlet and below the gas outlet to change the direction of flow of the air stream leaving the wash water adjacent the water outlet.

4. A gas scrubber comprising a chamber adapted to contain a body of wash water, a combination gas and water inlet at one end of said chamber adapted to be so connected by means of a water seal to a conduit for the gas that the water overflowing from said seal flows into said chamber, separate gas and water outlets at the opposite end of said chamber, said gas outlet being above the water outlet and having a cross-sectional area substantially larger than the cross-sectional area of the gas and water inlet, an adjustable partition dipping below the normal surface of the water in the chamber between the combination gas and water inlet and the separate gas and water outlets, said partition partially dividing the chamber into an inlet part of a relatively small cross-sectional area and an outlet part of a relatively large cross-sectional area so that the velocity of the gas passing through the restricted passageway formed by the partition and the side walls and bottom of the chamber is decreased as the gas enters the outlet part of said chamber, a baffle extending from the outlet wall of said chamber above and adjacent to said water outlet for rapidly changing the direction of flow of gases leaving said wash water in the neighborhood of the water outlet and filtering means located above said baffle and in the path of the gases leaving said chamber through the gas outlet.

5. A gas scrubber for removing emulsifiable constituents from a gas stream, the said scrubber comprising a chamber adapted to contain a body of wash water, a gas inlet in one end of said chamber, a gas outlet in the opposite end of said chamber having a cross-sectional area substantially greater than that of the gas inlet, a vertically adjustable partition within said chamber between the gas inlet and gas outlet dividing the chamber into an inlet portion and an outlet portion of substantially larger volume than said inlet portion, the lower end of said partition extending below the normal surface of the body of wash water in said chamber and forming with the bottom of the chamber a restricted passageway for gases passing through said chamber, means for introducing fresh water to the inlet portion of said chamber, said means including a water seal so connecting the gas inlet to a source of the gases to be scrubbed that the overflow from said water seal flows into the inlet portion of the chamber through the gas inlet, a water outlet in the outlet portion of said chamber for the removal of used wash water and the emulsifiable constituents of the gas stream from said chamber, said water outlet being located below the gas outlet and opposite the restricted passage below said partition, a baffle extending from the outlet wall of said chamber above and adjacent said water outlet for rapidly changing the direction of flow of gases leaving said wash water in the neighborhood of the water outlet and filtering means located above said baffle and in the path of the gases leaving said chamber through the gas outlet.

OSCAR W. HUPP.